Aug. 20, 1946.  C. M. SHARPE  2,405,984
ELECTRIC COOKER
Filed Aug. 19, 1943  2 Sheets-Sheet 2

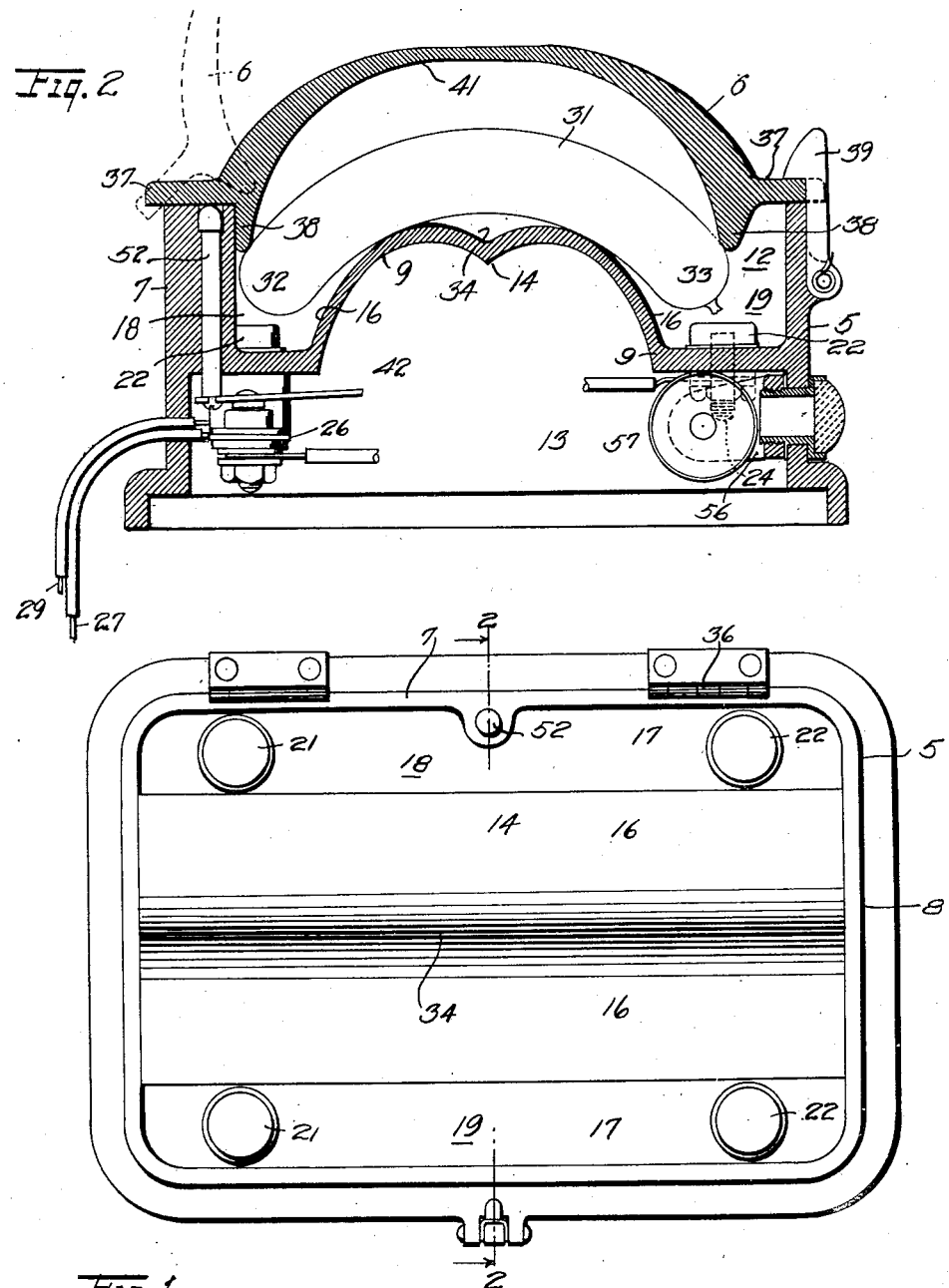

INVENTOR
CHARLES M. SHARPE
BY Gardner & Warren
his attys.

Patented Aug. 20, 1946

2,405,984

UNITED STATES PATENT OFFICE 2,405,984

ELECTRIC COOKER

Charles M. Sharpe, San Francisco, Calif.

Application August 19, 1943, Serial No. 499,191

1 Claim. (Cl. 99—358)

The invention relates to a cooker designed for cooking food articles such as frankfurters, hamburgers and the like, the cooking being effected by utilizing the article as a conductor for an electric current. More especially the invention relates to this type of cooker in which the frankfurters for instance are arranged for positioning on an elevated support with the opposite ends of the frankfurter bent down and held immersed in separate liquid wells, an electric terminal being provided in each well and the current is caused to pass from one terminal to the other by way of the liquid in the wells and in the frankfurter.

An object of the invention is to provide a cooker of the character described which is formed in such manner and of such material that there will be no danger of the parts being deleteriously effected by contact with or exposure to the food and liquid during the cooking operation.

Another object is to provide a cooker of the character described in which a minimum of contact of the food with the cooker will be required, all portions of the food will be subjected to the same cooking conditions and no portion of the food may be impaired by contact or exposure to the cooker parts.

A further object of the invention is to provide a cooker of the character described which may be easily cleaned and kept in a sanitary condition.

A still further object of the invention is to provide a cooker of the character described in which all of the electrical connections and operating mechanism are entirely removed from the cooking compartment.

Yet another object is to provide a cooker of the character described which will be both easy and safe to operate.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claim.

Referring to said drawings:

Figure 1 is a top plan view of the cooker with the cover removed.

Figure 2 is a vertical sectional view of the cooker taken on the line 2—2 of Figure 1, but with the cover included and in closed position.

Figure 3:
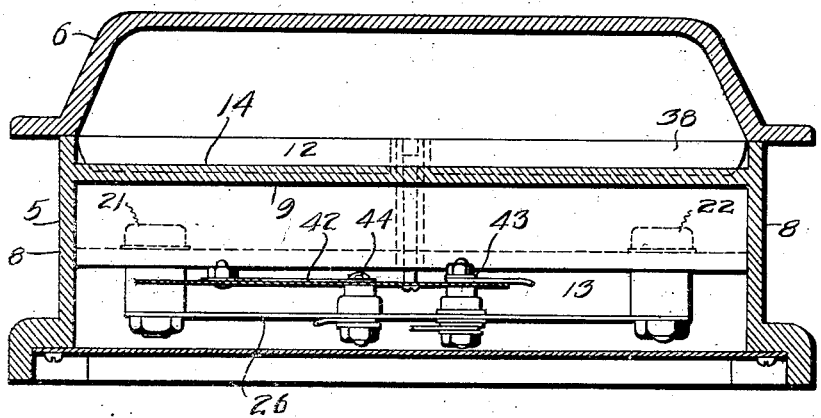
Figure 3 is a vertical sectional view taken on the line 3—3 of Figure 2.
Figure 4:
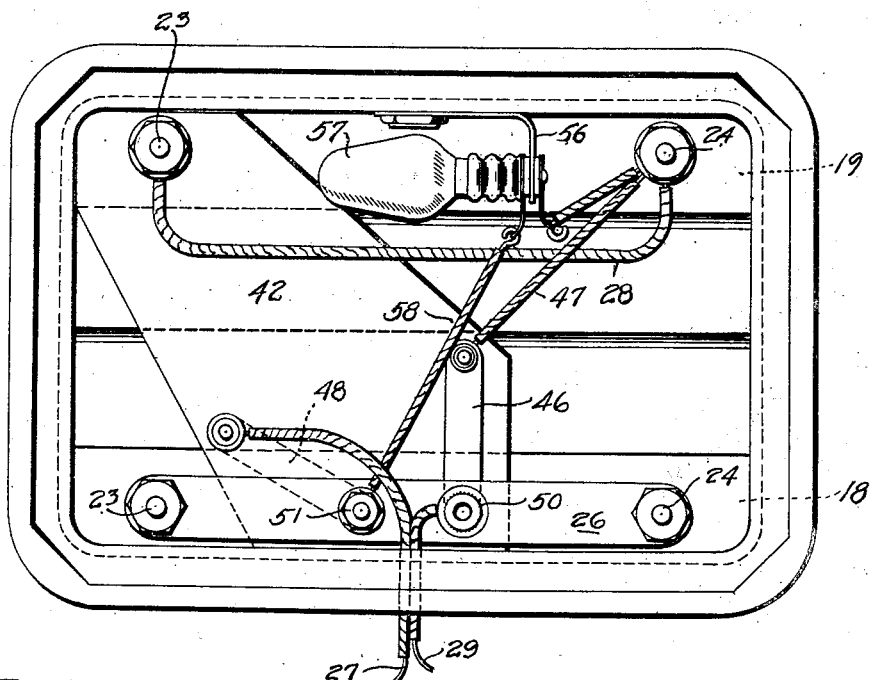
Figure 4 is a bottom view of the cooker.

In the embodiment of my invention as here illustrated, the cooker includes a receptacle 5 and a cover 6 therefor, the receptacle comprising side and end walls 7 and 8 and a horizontal partition 9 which divides the receptacle into upper and lower compartments 12 and 13 and forms what may be termed a false bottom for the receptacle. The compartment 13 provides a space in which the electrical apparatus for the cooker is contained, while the compartment 12 is designed to form the space for cooking.

The partition 9 is formed with a centrally elevated portion 14 which extends from one end wall to the other and provides a member on which the frankfurters, hamburgers, or other food articles to be cooked, are arranged to be supported. The portion 14 is in the form of an arch, and the opposite sides 16 thereof extend downwardly and outwardly to planar portions 17 which in combination with such sides and the contiguous side and end walls of the receptacle define liquid wells 18 and 19. Arranged within each of the wells are a pair of electrical terminals 21 and 22 mounted on posts 23 and 24 extending from compartment 13 through the planar portions 17. The posts 23 and 24 associated with the terminals 21 and 22 in well 18 are connected by a bus bar 26 which is arranged for connection to one of the leads 27 of a source of electric current, while the terminals 21 and 22 of well 19 are connected by a conductor 28 and to the other lead 29 of such current.

In cooking the food articles, the frankfurter or the like designated by the reference numeral 31, is positioned to extend across the arch 14, as shown in Figure 2, and with its ends 32 and 33 extending into the wells 18 and 19; the wells being filled with a liquid such as a saline solution, which will conduct an electrical current, and sufficient liquid is placed in the wells to cover the terminals and permit the immersion of the ends 32 and 33 in the liquid. In this manner when the terminals are energized, the current will flow from the liquid in one well through the frankfurter and into liquid of the other well, thus heating the frankfurter so that by leaving the current on for a relatively short time the frankfurter will become completely cooked. Preferably as will be most clear from Figure 2, the arch portion 14 is provided with a central depression 34 which extends for the full length of such portion and is closed at the ends by the end walls 8. This depression serves to trap any juice that may be discharged from the frankfurters and deposited on the supporting arch, and thus tends to provide a better cooking operation and at the same time prevent the juices from discharging into and mixing with the liquid in the wells. The above construction is also advantageous in that a firm support is provided for the frankfurter but with a minimum contact between the frankfurter and the support.

The cooking operation is preferably effected while the cover 6, which is connected by hinges 36 to one of the side walls 7, is positioned over the receptacle to close the compartment 12, and such cover is provided adjacent the side edges 37 thereof with ribs 38 which when the cover is moved to closed position are arranged to engage the ends 32 and 33 of the frankfurters and depress and hold them in the wells. A spring pressed dog 39 may be used for locking the cover in closed position.

An important feature of the present invention resides in forming both the receptacle and cover in such manner that no portion of the interior of the cooker will be liable to corrosion or tend to become unsanitary, and likewise no portion of the food may be contaminated by exposure to corroded surfaces or parts which may become unsanitary. As will be seen from the drawings, both the entire receptacle and the cover are each formed as a one-piece member, and preferably each of such members is made in the form of a casting of plastic material. By making the receptacle and cover in this manner, not only will all of the portions be effectively electrically insulated, but there will be no joints or cracks exposed to the interior of the cooking compartment and therefore no areas in which food particles may collect and make difficult the task of keeping the cooker in a clean and sanitary condition. In this connection, it may be explained that the portion of the terminals exposed in the wells are formed of carbon which is not affected by the solution in the wells and does not become or render the adjacent portions of the walls discolored notwithstanding continued and frequent use of the cooker. It will also be noted that no sharp corners or crevices are present in the compartment 12, and that particularly in connection with the wells and supporting arch, the surfaces are long and gentle sloping or curved and designed to permit easy access for use and cleaning. The above remarks as to design rendering the receptacle efficient for use and cleaning, are also applicable to the cover. Thus it will be noted by reference to Figure 2, that the portion on the inside between the frankfurter depressing ribs 38 is formed with a downwardly facing concavity 41 extending for the entire distance between the ribs and in fact defining one of the sides of the ribs. It will be noted that the ribs are positioned so as to engage the very end portions of the frankfurters, and thus all of the moisture condensing on the walls of the cavity will flow back upon the frankfurter and help the cooking operation. It will also be noted that the cavity is relatively deep and that the only portions designed to engage the frankfurter are the tips of the ribs. It will thus be seen that the frankfurter will be supported and held in position by but two points of contact on the upper side and two points of contact on the lower side.

In order to prevent any possibility of anyone inducing a flow of current by touching the terminals, the liquid, or the frankfurter, while the cover is open and the leads 27 and 29 are in contact with a source of current, a double-pole single-throw switch means is preferably incorporated in the leads and conductors. As here shown, such means is in relatively simple form and includes a spring plate 42 of insulating material which is supported by the binding post 23 associated with well 19 and has provided thereon a pair of contacts 43 and 44, the first of which is connected by conductors 46 and 47 to the other post 24 associated with such well, while the second contact 44 is connected by a conductor 48 to the lead 27. A pair of contacts 50 and 51 are positioned on the busbar 26 for engagement by the contacts 43 and 44 respectively, so that the circuit may be closed when a frankfurter is operatively supported with its opposite ends in the different wells. The contact 51 is in electric connection with bar 26, but the contact 50 while mounted thereon is insulated therefrom and connected to the lead 29. The spring plate 42 normally keeps the contacts 43 and 44 spaced from contacts 50 and 51, and such contacts are moved into engagement only when the cover 6 is in closed position as illustrated in Figure 2, there being provided in the side wall of the receptacle a plunger 52 which is secured to the plate and is forced downwardly to depress the plate by a portion 53 of the cover. As will be clear, when the cover is raised, the plunger is permitted to rise so that the plate will be released and the contacts disengaged. Preferably a mounting 56 for a pilot lamp 57 is provided on the front wall of the receptacle, and such light is connected in series in a conductor portion 58 between contact 51 and post 24 of well 19. The lamp as will be evident will be lit only when circuit is closed, and is designed to illuminate a colored glass 59 covering an opening 61 in the receptacle wall.

I claim:

In an electric cooker for frankfurters and the like, a one-piece receptacle having a transverse portion defining with the sides of the receptacle a pair of liquid wells spaced by a member having spaced longitudinally extending portions positioned to engage the frankfurters at spaced points intermediate the ends thereof and defining therebetween a depression intermediate the wells for trapping liquid on the member, electric conductors at each end of said wells extending upwardly through said transverse portion and having terminals exposed in said wells, and a cover for closing said receptacle having peripheral portions arranged to seat upon the receptacle sides and provided adjacent and inward of said portions with longitudinal portions extending downwardly relative to said peripheral portions and positioned to engage and depress therein the ends of the frankfurters supported on the longitudinal portions of said member, the said member being in the form of an arch in horizontal section with the side portions extending downwardly and outwardly to form the adjacent sides of the wells, and said cover being formed on the underside thereof with a concave surface complementary to said arch surface but spaced therefrom sufficiently to clear the frankfurter or the like and extending substantially from one of the downwardly projecting portions of the cover to the other so as to direct the condensing vapors on such surface to said projecting portions.

CHARLES M. SHARPE.